United States Patent [19]

Jendrzejczyk

[11] 4,343,198

[45] Aug. 10, 1982

[54] FLUID FORCE TRANSDUCER

[75] Inventor: Joseph A. Jendrzejczyk, Warrenville, Ill.

[73] Assignee: The United States of America as represented by the United States Department of Energy, Washington, D.C.

[21] Appl. No.: 214,801

[22] Filed: Dec. 9, 1980

[51] Int. Cl.³ .............................. G01L 5/16; G01L 1/22
[52] U.S. Cl. .................................. 73/862.65; 73/189; 73/862.04; 73/861.71
[58] Field of Search ........... 73/170 A, 862.04, 862.65, 73/861.71, 189

[56] References Cited

U.S. PATENT DOCUMENTS

| 2,377,212 | 5/1945 | Cottrell | 73/517 R |
|---|---|---|---|
| 2,544,738 | 3/1951 | Tint | 73/862.65 |
| 2,845,796 | 8/1958 | Morrison | 73/170 A |
| 3,365,943 | 1/1968 | Bloch | 73/189 |
| 3,878,714 | 4/1975 | Protta et al. | 73/189 |

FOREIGN PATENT DOCUMENTS

| 2389878 | 1/1979 | France | 73/862.04 |
|---|---|---|---|
| 513311 | 5/1976 | U.S.S.R. | 73/170 A |

*Primary Examiner*—Charles A. Ruehl
*Attorney, Agent, or Firm*—Robert J. Fisher; Richard G. Besha; James E. Denny

[57] ABSTRACT

An electrical fluid force transducer for measuring the magnitude and direction of fluid forces caused by lateral fluid flow, includes a movable sleeve which is deflectable in response to the movement of fluid, and a rod fixed to the sleeve to translate forces applied to the sleeve to strain gauges attached to the rod, the strain gauges being connected in a bridge circuit arrangement enabling generation of a signal output indicative of the magnitude and direction of the force applied to the sleeve.

11 Claims, 6 Drawing Figures

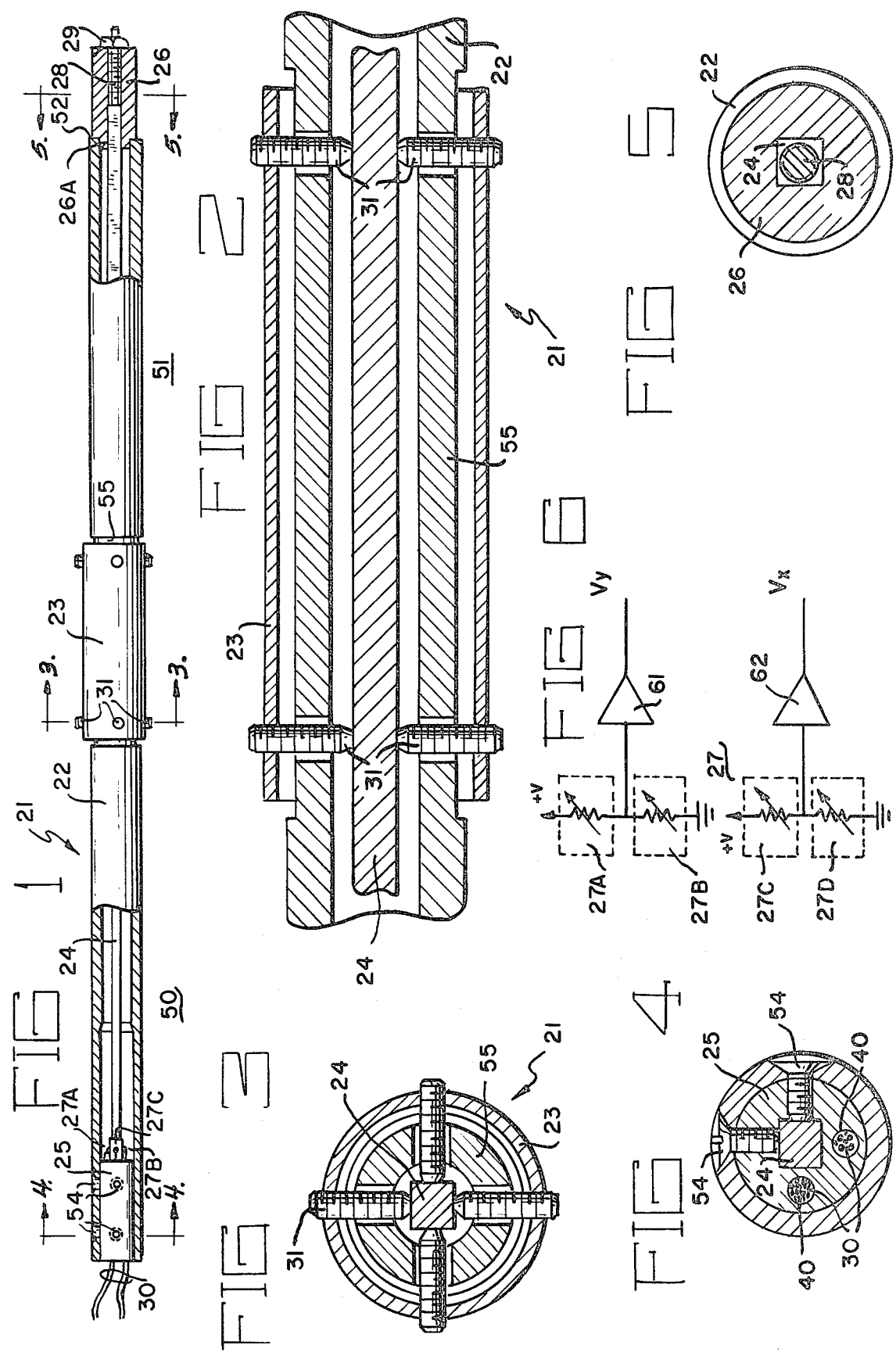

FLUID FORCE TRANSDUCER

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

The present invention relates generally to a fluid force transducer and, more specifically, to a device for detecting and measuring through the use of strain gauges, the magnitude and direction of forces produced by the movement of a fluid.

Considerable interest has been generated in developing more efficient heat exchangers of the type in which a thermally-conductive liquid is pumped through pipes submerged beneath a liquid to be cooled or heated in a fluid-containing vessel. Convection currents formed around the areas of thermal transfer, in addition to the recirculation of fluid within the containment vessel, may affect the efficient operation of a heat exchange system. The present state of the art is unable to predict the spontaneous upswelling of a heated fluid with any accuracy because of the intricate relations among temperature, viscosity, surface tension and other characteristics of the fluid and the individual containment vessel. In order to know more about convection and other currents within a contained fluid, it is necessary to take direct measurements.

Strain gauges have been used for a variety of test set-ups to measure forces on various structural elements. U.S. Pat. No. 4,133,201 discloses a testing method for vehicle axles. U.S. Pat. No. 4,110,829 discloses an apparatus and method for determining rotational and lineal stiffness between an output shaft and a power input shaft. U.S. Pat. No. 3,230,762 discloses a test set-up to provide a measuring device that will accurately indicate rotational resistance or preload torque in a reloaded ball screw and nut assembly. Other relevant references are U.S. Pat. Nos. 3,824,863; 3,664,182; 3,555,894, 3,336,795 and 3,163,037.

SUMMARY OF THE INVENTION

The force transducer of this invention is designed to measure magnitude and direction of the force exerted by the lateral motion of a fluid by the use of strain gauges to detect the deflection of a rod held under tension in the center of a support tube. A center section of the tube wall or "sleeve" is free to move slightly with the fluid flow and is connected to a rod which is secured axially of the tube. Thus, forces induced on the sleeve by the pressure of the flowing fluid are transmitted to the rod. Strain gauges measure the stress of the rod.

The magnitude and direction of the deflection of the rod is measured by the strain gauges. The strain gauges are typically of the variable resistance type. The change in the resistance of the strain gauges is detected to produce a signal, or signals, indicative of the magnitude and direction of the deflection of the rod. Preferably, the rod has a square cross section and four strain gauges are used, one associated with each surface of the rod, and the gauges are connected in an electrical bridge circuit arrangement.

DESCRIPTION OF THE DRAWINGS

The invention will be better understood when considered with the attached drawings of which:

FIG. 1 is a side view, partly in section, of a force transducer incorporating the present invention;

FIG. 2 is a fragmentary, close-up view in longitudinal cross section of the transducer of FIG. 1 showing the center portion of the tube wall or sleeve;

FIG. 3 is a transverse sectional view taken along sight line 3—3 of FIG. 1;

FIG. 4 is a transverse sectional view taken along sight line 4—4 of FIG. 1;

FIG. 5 is a transverse sectional view taken along sight line 5—5 of FIG. 1; and

FIG. 6 is a simplified representation of an electrical bridge circuit arrangement which provides a signal output indicative of the force measured by the strain gauges.

DESCRIPTION OF THE PREFERRED EMBODIMENT

The force transducer of the present invention is susceptible of embodiment in many different forms and in many different applications. However, the invention will be described in detail as a force transducer for measuring the magnitude and direction of forces exerted by the movement of fluid within a containment vessel such as a heat exchanger with the understanding that the present disclosure is to be considered as an exemplification of the principles of the invention and is not intended to limit the invention to the embodiment illustrated.

The fluid force transducer of the subject invention, generally designated by numeral 21 as best seen in FIG. 1, is comprised essentially of the following elements: a main support tube 22, a movable sleeve 23, a rod 24, end collars 25 and 26 to secure the rod, and strain gauge means 27, such as strain gauges 27A-27C shown in FIG. 1.

The rod 24 may have any symmetrical cross sectional shape; however, a number of factors may influence the shape used. The force transducer of the present invention is able to detect lateral force in two dimensions. A vector analysis in two dimensions requires information regarding a vertical and horizontal axis. Strain gauges generally detect tension or compression along only one axis and usually two are used for each axis, with one gauge mounted on each side of the structure to be tested for stress. Thus, for two dimensional reading, the minimum number of strain gauges required would be four.

The strain gauges could be mounted on a rod with a circular cross sectional shape but strain gauges do not mount on curved surfaces well. The use of rods with cross sectional shapes in the form of polygons with four sides or multiples of four in which all the angles and sides are equal is advantageous in that the strain gauges can be mounted in the center of perpendicular faces of the rod, thereby producing readings that can be easily analyzed in orthogonal axes. Rods with a rectangular cross sectional shape may be used where a preferred axis is desired. A rod having a rectangular cross sectional shape has greater flex for a given force applied perpendicular to the two wide sides. The greater movement of the rod allows the strain gauges to detect fluid motion of lesser magnitude along one axis.

It has been found that a square rod produces readings that can be easily analyzed and is easy to work with.

The described embodiment of the invention will, therefore, be discussed with regard to a force transducer with a rod of square cross sectional shape. Four strain gauges, including strain gauges 27A-27D shown in FIG. 6, are each mounted on a different face of the rod 24.

The force transducer has a proximal 50 and distal end 51. The transducer is attached to a wall of the containment vessel (not shown) or some other suitable structure at its proximal end such that the distal end and the movable sleeve are submerged in the fluid in the location in which force readings are desired.

The support tube 22 has a greater internal radius than the diagonal width of the square rod 24, so as to permit the rod to deflect in the tube without interference. The rod 24 is axially positioned within the support tube 22 and secured at the proximal end by a proximal slip fit collar 25 positioned within the support tube. The proximal collar 25 securely holds the square-shaped rod 24 within the center of the support tube 22. As shown in FIG. 4, the rod fits flush within a corresponding square hole in the proximal collar 25. The collar 25 and the rod 24 are secured to the support tube by four screws 54 positioned in pairs on two perpendicular planes of the square rod. The screws extend through holes in the support tube 22 and are received in threaded apertures in the collar 25 and finally make contact with the rod 24. Channels 40 are located within the proximal collar 25 on opposite sides of the rod relative to the screws to provided openings for the lead wires 30 extending to the strain gauges.

The rod 24 is secured at its distal end by a distal slip fit collar 26 having a reduced section 26A. The distal slip fit collar 26 is positioned over the opening at the end of the support tube 22, with the reduced section 26A of the collar 26 fitting flush into the support tube. The collar 26 is prevented from sliding further into the support tube by a ridge 52 on the collar.

As shown in FIG. 5, the steel rod 24 fits snugly within a corresponding square hole in the distal collar 26. The distal end of the rod 24 is threaded as at 28 with a radius smaller than the diagonal of the square cross section of the rod. The threaded screw area 28 can thus easily be inserted through the square hole of the distal collar 26. The threaded screw area 28 extends beyond the distal collar where it is fitted with a nut 29. The nut 29 is tightened to hold the distal collar 26 firmly over the support tube 22 at the ridge 52 and to place the rod 24 in tension.

An intermediate section of the support tube 22 is provided with a reduced diameter as at 55. A sleeve 23 with an inside diameter greater than the outside diameter of the reduced section of the tube fits loosely over that section. The sleeve 23 is secured to the square rod 24 by eight centering screws 31 arranged in opposing pairs. The sleeve 23 has corresponding threaded openings through which the screws extend inwardly through openings in the support tube to make secure contact with the square rod 24 centered within the sleeve as shown in FIG. 3 and FIG. 2. The rod will thus deflect slightly as fluid flows over the sleeve and induces a pressure on it.

The four strain gauges are located near the proximal collar 25 on each side of the square-shaped rod. Wire leads 30 from the strain gauges exit from the support tube through the channels 40 in the proximal collar 25 facilitating connection of the strain gauges in a bridge circuit arrangement, as shown in FIG. 6, for sensing changes in the electrical resistance of the four strain gauges 27A-27D.

Referring to FIG. 6, two bridge amplifier circuits 61 and 62 are used. One bridge circuit suitable for this application is the Type D-22 Strain Gauge Bridge Amplifier Circuit which is commercially available from UnHoltz-Dickie. Strain gauges 27A and 27B, which are mounted on the upper and lower surfaces of the rod 24, are connected in circuit with bridge amplifier circuit 61, and the strain gauges 27C and 27D, which are mounted on the side surfaces of the rod 24, are connected in circuit with bridge amplifier circuit 62. Bridge amplifier circuit 61 provides a signal output Yv indicative of tension or compression resulting from vertical deflection of the rod. The other bridge amplifier circuit 62 provides a signal Vx indicative of tension or compression resulting from horizontal or longitudinal deflection of the rod 24.

Fluid flowing around the support tube exerts a force on the movable sleeve 23 causing a slight deflection of the movable sleeve 23 and the rod 24 to which it is secured varying in direction and magnitude with the force applied. The circuits 61 and 62 detect the magnitude of the tensing or compressing or the rod caused by the rod's movement about horizontal and vertical axes. The tension and compression change the resistance of the associated pairs of strain gauges 27A-27B, and 27C-27D, producing a corresponding change in the signal outputs Vx and Vy of the two bridges amplifier circuits 61 and 62. Through vector analysis of the output signal readings for both axes, a single vector force representing the magnitude and the direction of the actual force on the sleeve may be readily calculated.

The embodiments of this invention in which an exclusive property or privilege is claimed are defined as follows:

1. A force transducer for use with a bridge circuit means for sensing changes in strain gauge means comprising:
   support tube means;
   a rod positioned longitudinally within said support tube;
   first and second support means for securing the respective ends of said rod under tension to said tube;
   a sleeve extending about said support tube and rigidly connected to said rod; and
   circuit means including strain gauge means attached to said rod for measuring stress in said rod.

2. A force transducer as described in claim 1 wherein said rod has a cross sectional shape of a polygon having all sides and angles equal wherein the number of said sides is a multiple of four.

3. A force transducer as described in claim 1 wherein said rod is axially positioned within said support tube and has a square cross section, and said strain gauge means comprises a strain gauge mounted on each planar surface of said rod.

4. A force transducer as described in claim 3 wherein said strain gauges are in orthogonal relationship on each planar surface of said rod; and said circuit means comprises first and second bridge circuit means each including a pair of said strain gauges, each strain gauge on an opposing surface of said rod, said bridge circuit means generating signals representative of the orthogonal force components of the radial force applied to said sleeve.

5. A force transducer as described in claim 3 wherein said first and second support means comprise:

a proximal collar received in and fixed to said support tube and defining a square hole receiving said square rod;

a distal collar defining a square hole for receiving said square rod, said distal collar having a reduced inner end received in said support tube and a shoulder adjacent said reduced end abutting the distal end of said support tube;

said rod having its distal end defining a screw thread extending beyond said distal collar; and a nut engaged on said screw thread for forcing said shoulder of said distal collar against the end of support tube and thereby applying tension to said rod when said nut is tightened.

6. A force transducer as described in claim 3 further comprising means for attaching said sleeve to said rod comprising:

a plurality of screws received in threaded holes located on said sleeve in opposing pairs and extending through said support tube such that a pair of screws align with each other and with the center of opposite planar surfaces of said rod to securely grip said rod;

said screws securely engaging said rod transmitting forces applied to said sleeve directly to the center of the associated planar surfaces of rod; and said screws allowing adjustment to center said sleeve relative to said rod.

7. A force transducer comprising:

a support tube;

a rod axially positioned within said support tube;

first and second support means at opposite ends of said support tube for securing the ends of said rod respectively to said tube and including means for applying tension along the length of the rod by compressing said tube against said rod;

strain gauge means for measuring stress in said rod as said rod deflects;

a sleeve extending freely about said support tube;

means for rigidly attaching said sleeve to said rod to permit external radial forces to be transmitted from said sleeve directly to said rod independent of said support tube; and bridge circuit means including said strain gauge means for generating signals representative of the orthogonal force components of the radial force applied to said sleeve.

8. A force transducer as described in claim 7 wherein the rod has a cross sectional shape of a polygon having all sides and angles equal where the number of sides is a multiple of four.

9. A force transducer as described in claim 7 wherein:

the rod axially positioned within said support tube has a square cross section;

said strain gauge means comprises a strain gauge mounted on each planar surface of said rod.

10. A force transducer as described in claim 9 wherein said first and second support means comprise:

a proximal collar received in and fixed to said support tube and defining a square hole receiving said square rod;

a distal collar defining a square hole for receiving said square rod, said distal collar having a reduced inner end received in said support tube and a shoulder adjacent said reduced end abutting the distal end of said support tube;

said rod having its distal end defining a screw thread extending beyond said distal collar; and a nut engaged on said screw thread for forcing said shoulder on said distal collar against the end of support tube and thereby applying tension to said rod when said nut is tightened.

11. A force transducer as described in claim 7 further comprising means for attaching said sleeve to the rod, including:

a plurality of screws received in threaded holes located on said sleeve in opposing pairs and extending through said support tube such that a pair of screws align with each other and with the center of opposite planar surfaces of said rod to securely grip said rod;

said screws securely engaging said rod transmitting forces applied to said sleeve directly to the center of the associated planar surfaces of rod; and said screws allowing adjustment to center said sleeve relative to said rod.

* * * * *